(12) United States Patent
Marupaduga et al.

(10) Patent No.: US 9,596,053 B1
(45) Date of Patent: Mar. 14, 2017

(54) METHOD AND SYSTEM OF SERVING A USER EQUIPMENT DEVICE USING DIFFERENT MODULATION AND CODING SCHEMES

(71) Applicant: Sprint Spectrum L.P., Overland Park, KS (US)

(72) Inventors: Sreekar Marupaduga, Overland Park, KS (US); Andrew M. Wurtenberger, Olathe, KS (US); Matt Masters, Greenfield, IN (US); Patrick J. Schmidt, Bonner Springs, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 137 days.

(21) Appl. No.: 14/596,884

(22) Filed: Jan. 14, 2015

(51) Int. Cl.
*H04W 16/28* (2009.01)
*H04L 1/00* (2006.01)
*H04W 88/08* (2009.01)

(52) U.S. Cl.
CPC ........... *H04L 1/0015* (2013.01); *H04W 88/08* (2013.01)

(58) Field of Classification Search
CPC .... H04W 48/16; H04W 16/28; H04W 72/046
See application file for complete search history.

(56) References Cited

U.S. PATENT DOCUMENTS

| | | | | |
|---|---|---|---|---|
| 2002/0044539 A1* | 4/2002 | Ozluturk | ................. | H04B 1/707 370/335 |
| 2009/0233545 A1* | 9/2009 | Sutskover | ................. | H01Q 3/26 455/25 |
| 2011/0183623 A1* | 7/2011 | Yang | ..................... | H04B 7/0408 455/63.1 |
| 2011/0268045 A1* | 11/2011 | Heo | ....................... | H04L 1/0027 370/329 |
| 2012/0014269 A1* | 1/2012 | Ray | ..................... | H04W 74/006 370/252 |
| 2012/0320841 A1* | 12/2012 | Miki | .................... | H04B 7/0689 370/329 |
| 2013/0072243 A1* | 3/2013 | Yu | ........................ | H04B 7/0695 455/509 |
| 2014/0073337 A1* | 3/2014 | Hong | ................... | H04W 16/28 455/452.1 |
| 2016/0044517 A1* | 2/2016 | Raghavan | ............. | H04W 16/28 370/329 |
| 2016/0157046 A1* | 6/2016 | Weizman | .............. | H04W 4/008 370/252 |
| 2016/0165626 A1* | 6/2016 | Finne | ................ | H04W 72/1268 370/336 |

* cited by examiner

*Primary Examiner* — Khaled Kassim
*Assistant Examiner* — Syed S Ali

(57) ABSTRACT

According to the present disclosure, a base station may be configured to serve a user equipment device (UE) over two or more beams using different modulation and coding schemes (MCSs) in response to determining that another base station is concurrently serving another UE at nearly the same location. For instance, a first base station may initially serve a first UE over two beams using the same MCS on both beams. The first base station may then determine that a second base station is serving a second UE at nearly the same location. And in response, the first base station may then change the MCS on at least one of the two beams so that the first base station then serves the first UE using different MCSs on the two beams. Serving the first UE with different MCSs concurrently on multiple beams may help to improve the first UE's reception.

8 Claims, 3 Drawing Sheets

METHOD AND SYSTEM OF SERVING A USER EQUIPMENT DEVICE USING DIFFERENT MODULATION AND CODING SCHEMES

BACKGROUND

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate and engage in air-interface communication with the network. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs.

The cellular wireless network may operate in accordance with an agreed air-interface protocol or "radio access technology," examples of which include Code Division Multiple Access (CDMA) (e.g., 1×EV-DO and 1×RTT), Long Term Evolution (LTE) (e.g., FDD LTE and TDD LTE), WiMAX, iDEN, TDMA, AMPS, Global System for Mobile Communications (GSM), GPRS, UMTS, EDGE, MMDS, WI-FI, and BLUETOOTH. Generally, the agreed air-interface protocol may define a downlink (or forward link) for carrying communications from the base stations to UEs and an uplink (or reverse link) for carrying communications from UEs to the base stations. Further, the agreed air-interface protocol may employ techniques such time-division multiplexing, frequency-division multiplexing, and/or code-division multiplexing to divide the downlink and uplink into discrete resources (e.g., LTE resource blocks, 1×EV-DO timeslot resources, etc.), which may then be used to carry control and/or bearer data between the base station and particular UEs.

OVERVIEW

Due to advances in antenna system technology, a base station may now be capable of transmitting bearer data to a UE over a distinct radiation pattern, or "beam," that is specifically defined for that UE. To do this, the base station could receive a sounding reference signal from the UE and make use of the phase and/or other characteristics of that received signal (e.g., phase differences between various antennas or antenna elements) in order to form the beam for the UE, and the base station could then use the UE-specific beam to transmit bearer traffic to the UE. This UE-specific beam may enable the base station to increase the power at which the UE receives bearer traffic and can thereby help improve the UE's reception and/or throughput.

Additionally, a base station may also be capable of transmitting bearer data to a UE over multiple UE-specific beams. For instance, a base station could be configured to transmit the same bearer data to the UE on the multiple UE-specific beams, which may help to increase the UE's reception of that bearer data. Or a base station could be configured to transmit different bearer data to the UE on the multiple UE-specific beams, which may help to increase the UE's throughput.

When serving a UE over two or more UE-specific beams, a base station may be configured to transmit bearer data over each beam using the same modulation and coding scheme (MCS), which generally comprises a combination of a particular modulation scheme (e.g., Quadrature Phase Shift Keying (QPSK), 16 Quadrature Amplitude Modulation (16QAM), or 64QAM) and a particular code rate. For instance, a base station may select an MCS based on the reported radio frequency (RF) conditions being detected by the UE, which may be reflected by a parameter such as a channel quality indicator (CQI), and the base station may then transmit bearer data over each beam using this same MCS. According to this technique, the base station may select a lower-order MCS that generally provides more reliable (but less efficient) transmissions when the UE is reporting relatively weak RF conditions and may select a higher-order MCS that generally provides more efficient (but potentially less reliable) transmissions when the UE is reporting relatively strong RF conditions.

While such an arrangement may enable a base station to serve a given UE on the two or more beams using the highest-order MCS supported by the current RF conditions detected by the UE, which may maximize the given UE's throughput, there may be network conditions that inhibit the given UE's reception of bearer data over the two or more beams. For example, there may be times when an adjacent base station is serving another UE that is located in the same general area as the given UE, which may give rise to interference that inhibits the given UE's reception of bearer data over the two or more beams. Other network conditions that inhibit the given UE's reception may arise as well.

Disclosed herein are methods and systems that help to address this issue. In accordance with the disclosure, a first base station may decide to serve a first UE over two or more beams, where the default mode may be to use the same MCS for each of the two or more beams. Either at the time of this decision or at some later time while serving the first UE over the two or more beams, the first base station may then determine that an adjacent second base station is serving a second UE that is located in close proximity to the first UE (e.g., the first and second UEs are within a threshold distance of one another). In response to this determination, the first base station may then begin using different MCSs for the bearer-data transmissions over the first UE's beams (e.g., by changing the MCS for one of the beams to a lower-order MCS). In theory, this use of different MCSs for the first UE's beams may be able compensate for some of the interference caused by the adjacent base station's transmission to the second UE, and may thus help to improve the reception by the first base station.

Accordingly, in one respect, disclosed is a method carried out by a first base station that involves (a) deciding to serve a first UE over two or more beams, (b) making a determination that a second base station is serving a second UE located in close proximity to the first UE, and (c) in response to the determination, serving the first UE over the two or more beams using different MCSs.

In this method, the act of deciding to serve the first UE over the two or more beams may take various forms. According to one implementation, this act may involve deciding to initially use a same MCS to serve the first UE over each of the two or more beams. This MCS may be selected based on various factors, an example of which may include channel quality indicators (CQIs) received from the first UE. The act of deciding to serve the first UE over the two or more beams could involve various other functions as well.

Further, the act of determining that the second base station is serving the second UE located in close proximity to the first UE may take various forms. In one possible implementation, this act may involve (i) obtaining location data for one or more UEs being served by the second base station, wherein the one or more UEs includes the second UE, (ii) based on the obtained location data, comparing a location of each of the one or more UEs being served by the second base station to a location of the first UE, and (iii) determining that the location of the second UE is within a threshold short distance of the location of the first UE. Other implementations are possible as well.

Further yet, the act of serving the first UE over the two or more beams using different MCSs may take various forms. In one implementation, this act may involve changing a respective MCS for at least one of the two or more beams from an initially-selected MCS to a different MCS (e.g., a lower-order MCS). Other implementations are possible as well. Additionally, at a minimum, this act involves using a different respective MCS for at least one of the two or more beams, and in some implementations, this act may involve using a different respective MCS for each of the two or more beams.

In another respect, disclosed is a base station that includes (a) a wireless communication interface arranged to engage in air-interface communication with one or more UEs and (b) a controller configured to carry out the base station functions disclosed herein.

In yet another respect, disclosed is a non-transitory computer readable medium having instructions stored thereon, where the instructions are executable by a processing unit to cause a base station to carry out the base station functions disclosed herein.

These as well as other aspects and advantages will become apparent to those of ordinary skill in the art by reading the following detailed description, with reference where appropriate to the accompanying drawings.

DETAILED DESCRIPTION

Figure 1:
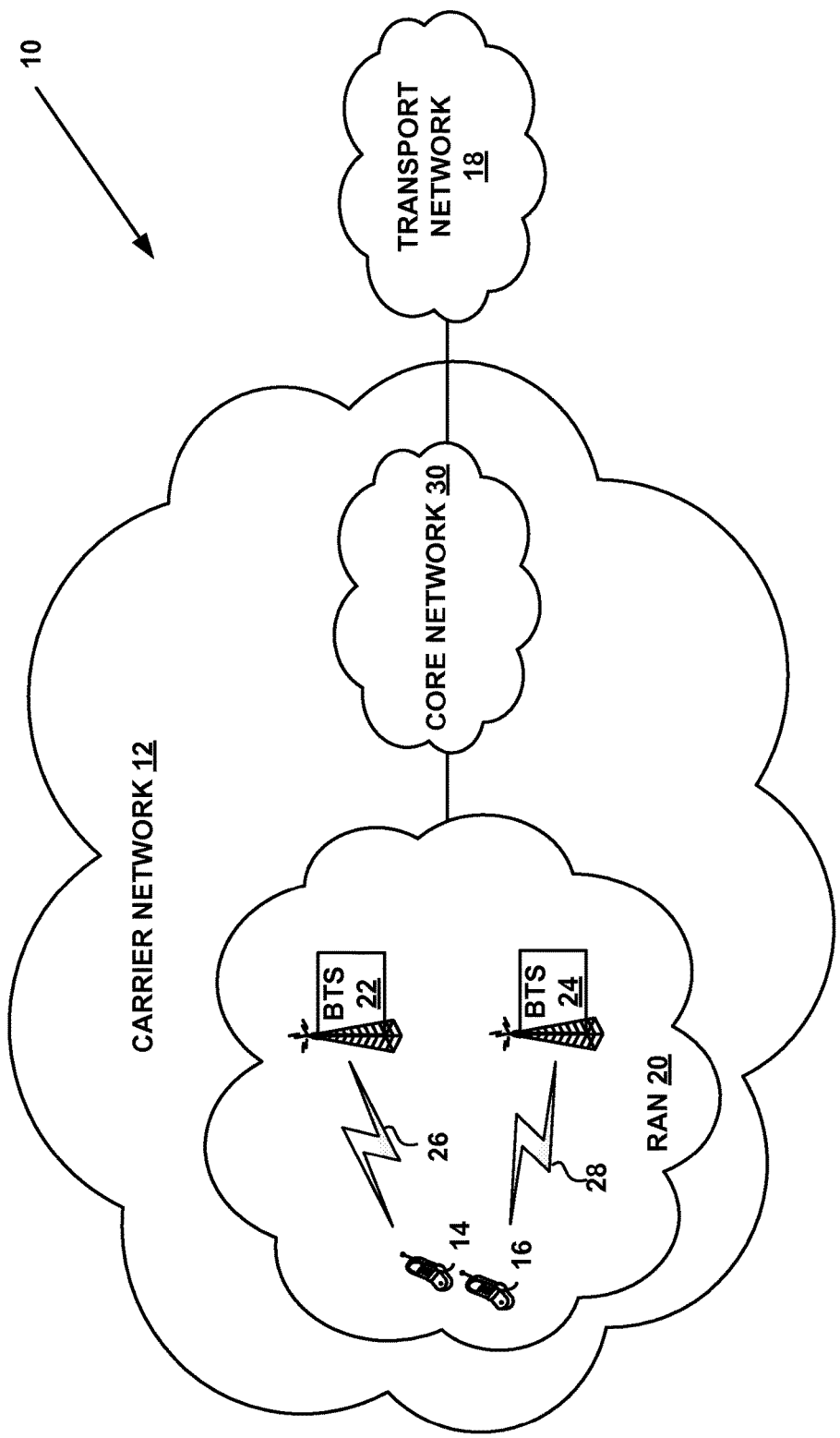
FIG. 1 is a simplified block diagram of an example communication system in which in which embodiments of the disclosed methods can be implemented.

Referring to the drawings, FIG. 1 is a simplified block diagram of an example communication system 10 in which embodiments of the disclosed methods can be implemented. It should be understood, however, that this and other arrangements described herein are set forth as examples only. As such, those skilled in the art will appreciate that other arrangements and elements (e.g., machines, interfaces, functions, orders of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions may be carried out by a processor executing instructions written in any suitable programming language and stored in memory.

FIG. 1 depicts example system 10 as including a representative wireless carrier network 12 that facilitates wireless communication with UEs, such as representative UEs 14 and 16, and provides connectivity with one or more transport networks (e.g., the public switched telephone network (PSTN) and/or the Internet), such as representative transport network 18. Wireless carrier network 12 may take the form of one or more radio access networks (RANs), such as representative RAN 20, each communicatively coupled to a core network 30. Other arrangements are possible as well.

RAN 20 may include one or more base stations (e.g., base transceiver stations (BTSs), access nodes, node-Bs, eNodeBs, etc.), each including an antenna system for emitting radio frequency (RF) radiation on a base carrier frequency to define one or more coverage areas in which the base station can engage in air-interface communication with UE. (In some implementations, the antenna system may also emit RF radiation on a secondary carrier frequency in one or more coverage areas.) For example, FIG. 1 shows RAN 20 as including two representative base stations 22, 24 that each provides a respective coverage area 26, 28 in which to serve UEs.

As noted above, in practice, each of these base stations may be arranged to engage in air-interface communication with UEs according to an agreed air-interface protocol (such as one of those noted above) that defines a downlink for carrying communications from the base station to UEs and an uplink for carrying communications from UEs to the base station. And the agreed air-interface protocol may also employ techniques such time-division multiplexing, frequency-division multiplexing, and/or code-division multiplexing to divide the downlink and uplink into discrete resources that can be allocated for carrying control and/or bearer data between the base station and particular UEs.

By way of example and without limitation, an LTE protocol may define a downlink that spans a particular bandwidth (e.g., 1.4 MHz, 3 MHz, 5 MHz, 10 MHz, or 20 MHz). In turn, the LTE protocol may divide the time and frequency domains into discrete "resource blocks," which may be used to carry control and/or bearer data to UEs. In particular, in the time domain, the LTE downlink may be divided into transmission time intervals (TTIs), or sub frames, that each have a duration of 1 millisecond (ms) and consist of two 0.5 ms timeslots. And in the frequency domain, the LTE downlink may be divided into groups of 12 sub carriers that each have a bandwidth of 15 KHz (for a total group bandwidth of 180 kHz), with each group of sub-carriers in a given TTI timeslot defining a different resource block. Thus, in each TTI slot, the LTE downlink has a finite number of resource blocks that is limited by the downlink's channel bandwidth. The LTE uplink may have a similar configuration.

The LTE protocol may also define various channels that are mapped onto the resource blocks of the carrier's downlink and uplink. For instance, on the downlink, a first portion of time of each resource block in each TTI slot may define channels for use in carrying control signaling from the base station to UE, such a physical downlink control channel (PDCCH), a Physical Control Format Indicator Channel (PCFICH), and a Physical Hybrid ARQ Indicator Channel (PHICH). Then, the remaining portion of each resource block in a given TTI slot (other than any portion reserved for reference symbol use or the like) may define a Physical Downlink Shared Channel (PDSCH) for use in carrying bearer data from the base station to UEs.

The LTE uplink may have channels that are mapped to the uplink resource blocks in a similar manner, including a Physical Uplink Control Channel (PUCCH) that primarily serves to carry control signaling from UEs to the base station, a Physical Random Access Channel (PRACH) that primarily serves to carry random access preambles from UEs to the base station, and a Physical Uplink Shared Channel (PUSCH) that primarily serves to carry bearer data from UEs to the base station.

Referring again to FIG. 1, although not shown, RAN 20 may further include one or more controllers that may provide connectivity to core network 30 and may also help to control aspects of the RAN's one or more base stations, such as aspects of antenna-system operation and/or air-interface communication. In one implementation, for instance, RAN 20 may include a separate controller (e.g., a base station controller (BSC) or radio network controller (RNC)) that sits between base stations 22, 24 and core network 30. In another implementation, each of base stations 22, 24 may include an integrated controller. Other arrangements are possible as well, including arrangements in which at least a portion of the controller resides in core network 30.

Core network 30 may then include network infrastructure (not shown) that provides connectivity between RAN 20 and transport network 18 and may also help to control aspects of RAN 20 and its one or more base stations. Depending on the radio access technology employed, this network infrastructure may take various forms. For example, if wireless carrier network 12 is operating in accordance with an LTE protocol, core network 30 may include entities such as a mobility management entity (MME), a serving gateway (SGW), a packet data network gateway (PGW), and/or a home subscriber server (HSS). As another example, if wireless carrier network 12 is operating in accordance with a CDMA protocol, core network 30 may include entities such as a mobile switching center (MSC), a packet data serving node (PDSN), a home location register (HLR), and/or a visitor location register (VLR). The core network's infrastructure may take various other forms as well. (It should also be understood that at least some of these entities might be considered to be part of a network other than core network 30, such as RAN 20.)

Wireless carrier network 12 may also include other networks and/or entities that are not shown. As one possible example, wireless carrier network 12 may include a location system arranged to help determine the locations of UEs operating in wireless carrier network 12. Various other examples are possible as well.

Representative UEs 14 and 16 may each be any device capable of engaging in air-interface communication with wireless carrier network 12 according to an agreed air-interface protocol (such as one of those noted above). UEs 14 and 16 may thus take various forms, examples of which include a cellular telephone, a tablet or other wirelessly-equipped computer, a personal digital assistant (PDA), a personal navigation device (PND), and/or a mobile hotspot. Other examples are possible as well.

In accordance with the present disclosure, base stations 22, 24 may be configured to transmit bearer data to a UE over a distinct radiation pattern (or "beam") that is specifically defined for the UE. In practice, the base station may form such a UE-specific beam by adjusting the phase and/or magnitude of one or more antenna elements (which may be part of a single antenna array or multiple different antenna arrays) to dynamically direct the beam to the location of the UE. The base station may carry out this adaptive beamforming using any technique now known or later developed.

In certain circumstances, base stations 22, 24 may also be configured to transmit bearer data to a UE over multiple UE-specific beams, which may be defined by different sets of antenna elements. For example, a base station may be configured to transmit the same bearer data to the UE on the multiple UE-specific beams, to help increase the UE's reception of that bearer data. As another example, a base station may be configured to transmit different bearer data to the UE on the multiple UE-specific beams, to help increase the UE's throughput.

The base station may decide whether to use multiple beams for a bearer-data transmission in various manners. As one possible implementation, the base station may decide whether to use multiple beams for a bearer-data transmission to a UE based on factors such as the UE's capabilities, the RF conditions detected by the UE, etc. For example, if the base station determines that a UE has the capability to receive multiple beams and is detecting a threshold level of RF conditions, the base station may carry out the bearer-data transmission to the UE using two or more UE-specific beams. Other implementations are possible as well.

As noted above, when carrying out a bearer-data transmission to a UE over two or more UE-specific beams, a base station may use the same MCS for each beam. For instance, an LTE base station may be configured to select a given MCS for bearer-data transmission to a UE based on one or more CQIs received from the UE, which reflect the signal-to-noise ratio measured by the UE on the downlink, and to use that MCS for concurrent transmission on each of multiple beams to the UE. The CQI indices for downlink RF conditions generally range from 0 to 15, with lower indices reflecting weaker RF conditions and higher indices reflecting stronger RF conditions. Each different CQI index then in turn corresponds to a different MCS, with lower CQIs corresponding to lower-order MCSs and higher CQIs corresponding to higher-order MCSs. Table 1 below depicts one possible example of the relationship between CQI indices and MCSs:

TABLE 1

| CQI index | Modulation | Code Rate |
| --- | --- | --- |
| 0 |  | Out of Range |
| 1 | QPSK | 78/2014 ($\approx$0.076) |
| 2 | QPSK | 120/2014 ($\approx$0.12) |
| 3 | QPSK | 193/2014 ($\approx$0.19) |
| 4 | QPSK | 308/2014 ($\approx$0.30) |
| 5 | QPSK | 449/2014 ($\approx$0.44) |
| 6 | QPSK | 602/2014 ($\approx$0.59) |
| 7 | 16 QAM | 378/2014 ($\approx$0.37) |
| 8 | 16 QAM | 490/2014 ($\approx$0.48) |
| 9 | 16QAM | 616/2014 ($\approx$0.60) |
| 10 | 64QAM | 466/2014 ($\approx$0.45) |
| 11 | 64QAM | 567/2014 ($\approx$0.55) |
| 12 | 64QAM | 666/2014 ($\approx$0.65) |
| 13 | 64QAM | 772/2014 ($\approx$0.75) |
| 14 | 64QAM | 873/2014 ($\approx$0.85) |
| 15 | 64 QAM | 948/2014 ($\approx$0.93) |

Thus, in practice, a base station may use the most recent one or more CQIs received from the UE and a table such as the one above to select a single MCS for a bearer-data transmission over two or more UE-specific beams.

In a configuration such as the one described above, there may be times when two adjacent base stations are serving respective UEs in the same general location. For example, with reference to FIG. 1, base stations 22 may be serving UE 14 and base station 24 may be serving UE 16, where UEs 14 and 16 happen to be in the same general location. When a situation such as this arises, it could create interference that inhibits the reception of bearer data by the UEs—particularly if one or both of the UEs are receiving bearer data over multiple UE-specific beams. Disclosed herein are methods and systems to help address this issue.

Figure 2:
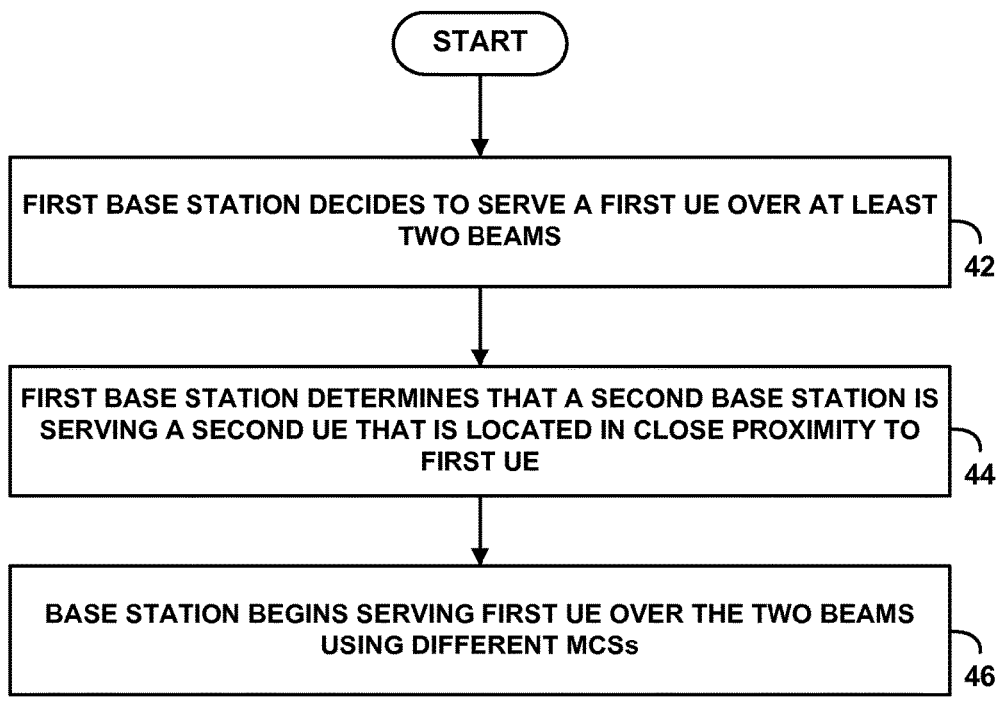
FIG. 2 is a flow chart depicting example functions that can be carried out in accordance the present disclosure.

Turning now to FIG. 2, a flow chart is shown to illustrate functions that can be carried out in accordance with the present disclosure. For purposes of illustration only, these functions are described below with reference to the example system depicted in FIG. 1. It should be understood, however, that these functions may be implemented in other wireless communication systems as well.

As shown in FIG. 2, at block 42, a first base station, such as base station 22, may decide to serve a first UE, such as UE 14, over at least two beams. In line with the discussion above, base station 22 may make this decision based on various factors, examples of which may include the capabilities of UE 14 and the RF conditions being detected by UE 14. Further, base station's decision could be to serve UE 14 over the two or more beams either by transmitting the same bearer data concurrently over the two or more beams (to help increase the UE's reception) or by transmitting different bearer data concurrently over the two or more beams (to help increase the UE's throughput).

When deciding to serve UE 14 over the two beams, base station 22 may be configured by default to select and initially use the same MCS for the bearer-data transmissions over both beams. Base station 22 may carry out this selection in various manners. For example, in line with the existing procedure discussed above, the base station's default mode may be to select an MCS based on an indicator of the RF conditions being detected by UE 14 (e.g., a CQI received from UE 14), and then to use this same MCS for the bearer-data transmissions over both beams. However, base station 22 may be configured to select and initially use an MCS for the bearer-data transmissions over the two beams in other manners as well.

At block 44, base station 22 may then determine that a second base station, such as base station 24, is serving a second UE that is located in close proximity to the UE 14, such as UE 16. Base station 22 may make this determination either at the time base station 22 first decides to serve UE 14 over the two beams (e.g., as part of the initial process for scheduling bearer-data transmissions to UE 14) or at some later time while base station 22 is serving UE 14 over the two beams. Base station 22 may carry out this determination in various manners.

In one implementation, base station 22 may be configured to first obtain location data for one or more UEs being served by base station 24, which could take the form of Global Position System (GPS) coordinate data, round-trip delay data, or the like. Base station 22 could obtain this data from various sources. For example, base station 22 may obtain this data directly from the adjacent base station over an X2 interface or the like. As another example, base station 22 may obtain this data from a network controller (e.g., an MME) that has an interface both with base station 22 and with the adjacent base station 24. Base station 22 may obtain this data from various other sources as well.

Further, base station 22 could obtain this data from such a source in various manners. As one example, base station 22 may be configured to periodically request this data from the source (e.g., at predefined time intervals) and may thus receive the data as a result of sending these requests. As another example, base station 22 may be configured to request and receive this data in response certain triggering events, such as when base station 22 begins serving a new UE. As yet another example, the source of the data (e.g., the adjacent base station 24) may be configured to push the data to base station 22 periodically and/or in response to certain triggering events, such as when the adjacent base station begins serving a new UE. Other examples are possible as well.

After obtaining the location data for the one or more UEs being served by the adjacent second base station, base station 22 may use this obtained location data along with location data for UE 14 to compare the respective locations of the one or more UEs being served by the adjacent second base station to the location of UE 14. Base station 22 could perform this comparison between UE locations using any technique now known or later developed, including techniques that involve triangulation or the like. As one possible example, the base station's comparison of these UE locations may involve calculating a distance between the UE locations and then comparing this distance to a threshold distance. However, various other techniques for comparing the UE locations may be used as well.

Based on the comparison between the location of UE 14 and the location of each of the one or more UEs being served by the adjacent second base station, base station 22 may then determine whether the adjacent second base station is serving any UE that is located in close proximity to UE 14. For example, if base station 22 determines that base station 24 is serving a UE having a location that is less than a predefined threshold distance from the location of UE 14 (e.g., within 500 feet, or within some other defined distance), base station 22 may thus determine that base station 24 is serving a UE that is in close proximity to UE 14. Base station 22 may determine that base station 24 is serving a UE that is located in close proximity to UE 14 in other manners as well.

At block 46, in response to determining that base station 24 is serving a UE that is located in close proximity to UE 14, base station 22 may begin using different MCSs for the respective bearer-data transmissions to UE 14 over the two beams. For instance, in one implementation, base station 22 may change the MCS for a given one of the two beams to a lower-order MCS (e.g., the MCS that corresponds to the next lowest CQI index value), and base station 22 may then begin transmitting bearer data to UE 14 on the given beam using this lower-order MCS while continuing to transmit bearer data to the UE on the other beam using the higher-order MCS. Alternatively, the base station could change the MCS on both beams, still resulting in each beam using a different MCS than the other beam. Other implementations are possible as well.

In theory, by using these different MCSs for the respective bearer-data transmissions to UE 14 over the two beams, base station 22 thus may be able compensate for some of the interference caused by the transmission from base station 24 to UE 16 and may thereby help to improve the reception by UE 14.

While FIG. 2 sets forth one representative implementation of how a base station may decide to use different MCSs when serving a UE over at least two beams, it should be understood that various other implementations may exist as well.

In one alternate implementation, instead of initially deciding to use the same MCS for the two beams and then later changing the MCS for one of the beams, a base station could just be configured by default to select and initially use two different MCSs when beginning to serve the UE over the two beams, or could be configured to initially begin using different MCSs per beam based on the analysis described herein.

In another alternate implementation, instead of deciding to use different MCSs for the two beams based on a determination that an adjacent base station is serving just one UE located in close proximity to the first UE, the base station's decision to use different MCSs for the two beams may be based on a determination that an adjacent base station is serving some other non-zero threshold number of UEs that are located in close proximity to the first UE. This threshold number may be predefined or may be determined dynamically by the base station, as examples.

In yet another alternate implementation, the first base station's decision to use different MCSs for the two beams could be based on more than just the location of the UEs being served by the adjacent second base station. For example, the first base station's decision to use different MCSs for the two beams could be based on a determination that the adjacent second base station is serving a second UE located in close proximity to the first UE and that the adjacent second base station is using the same MCS to serving the second UE that the first base station is using to serve the first UE. According to such an example, the first base station may be configured to obtain and consider both location data and MCS data for UEs being served by the adjacent second base station. Other examples are possible as well.

Various other alternate implementations along these lines may exist as well.

Figure 3:
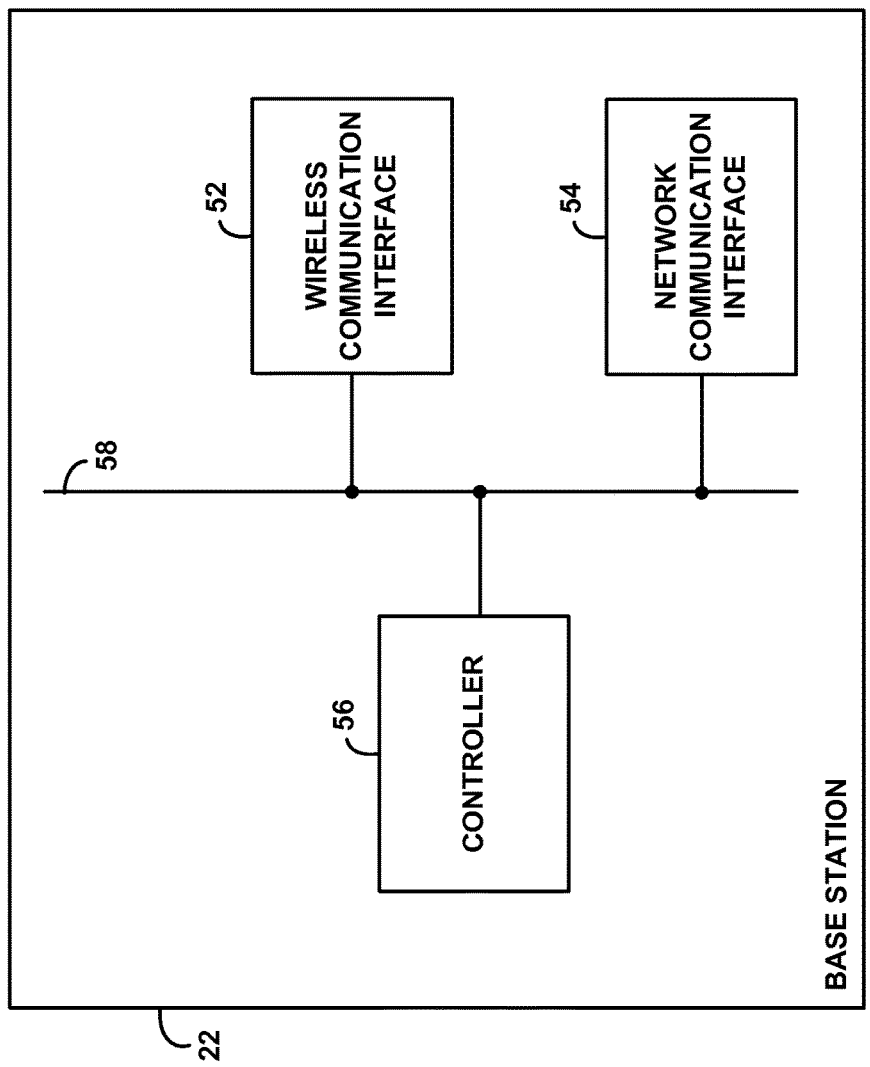
FIG. 3 is a simplified block diagram of an example base station operable in accordance with the present disclosure.

Turning now to FIG. 3, a simplified block diagram is shown to illustrate functional components that may be included in a representative base station, such as base station 22, to facilitate implementation of the disclosed methods. In particular, FIG. 3 shows representative base station 22 as including a wireless communication interface 52, a network communication interface 54, controller 56, all linked together via a system bus, network, or other connection mechanism 58. Base station 22 may include other components as well. Further, various ones of these components could be integrated together or provided in other arrangements.

Wireless communication interface 52 may comprise an antenna system for emitting RF radiation to define a coverage area in which base station 22 can engage in air-interface communication with UEs, where the RF radiation in the coverage area can be adaptively formed into UE-specific beams. Such an antenna system may be arranged in various manners. According to one arrangement, the antenna system may include at least one directional (or sectored) array of antenna elements and associated RF components (e.g., power amplifiers and transceivers) that are capable of adaptive beamforming. Such an antenna system may be an active antenna array, in which case each of the array's antenna elements may be integrated with respective RF components (e.g., a respective power amplifier and transceiver) that control the antenna element individually. Other arrangements are also possible.

Network communication interface 54 generally serves to connect base station 22 to wireless carrier network 12 (e.g., via a controller and/or some other entity). Network communication interface 54 may thus take any suitable form to serve this purpose, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 54 may also include multiple interfaces. Other configurations are possible as well.

Controller 56 may generally function to control the base station's air-interface communication with UEs, and may be configured to carry out various base station functions described herein. For instance, controller 56 may be configured decide that the base station is to serve a first UE over two or more beams and then cause the wireless communication interface to begin transmitting bearer data to the first UE over the two or more beams. As part of this process, controller 56 may initially decide to use the same MCS for each of the two or more beams. Further, controller 56 may be configured to make a determination that a second base station is serving a second UE located in close proximity to the first UE and then to responsively cause wireless communication interface 52 to transmit bearer data to the first UE over the two or more beams using different MCSs, which may help to improve the first UE's reception. Controller 56 may be configured to carry out various other functions as well.

Controller 56 could be implemented using hardware, software, and/or firmware. For example, controller 56 could include one or more processors and a non-transitory computer readable medium (e.g., volatile and/or non-volatile memory) that stores executable instructions. The executable instructions, when executed by the one or more processors, may cause controller 56 (and thus base station 22) to perform any of the base station functions described herein.

While example embodiments have been described above, those skilled in the art will understand that changes and modifications may be made to these embodiments without departing from the true scope and spirit of the present invention, which is defined by the claims.

We claim:

1. A method of managing communication on multiple beams, the method comprising:
   a first base station deciding to serve a first user equipment device (UE) over two or more beams, wherein each of the two or more beams defines a distinct respective radiation pattern from the base station to the first UE, and wherein deciding to serve the first UE over the two or more beams comprises (i) determining a modulation and coding scheme (MCS) based on one or more channel quality indicators (CQIs) received from the first UE and (ii) deciding initially to use the determined MCS on each of the two or more beams;
   the first base station making a determination that an adjacent second base station is serving a second UE located in close proximity to the first UE, wherein making the determination that the adjacent second base station is serving the second UE located in close proximity to the first UE comprises (i) obtaining, from the second base station or from a network controller, location data for the second UE, (ii) comparing location of the second UE with location of the first UE and (iii) determining that a distance between the second UE and first UE is threshold short; and
   in response to the determination that the adjacent second base station is serving a second UE located in close proximity to the first UE, the first base station (i) changing the MCS for a first of the beams from the determined MCS to a different MCS that is higher or lower order than the determined MCS, and (ii) serving the UE concurrently over the two or more beams using the different MCS for transmission from the base station to the UE over the first beam while using the determined MCS for transmission from the base station to the UE over a second of the beams, wherein the first base station uses an antenna system to provide the first and second beams.

2. The method of claim 1, wherein obtaining the location data for the second UE being served by the second base station comprises:
sending, to the second base station, a request for the location data; and
as a result of sending the request, receiving, from the second base station, the location data.

3. The method of claim 1, wherein making the determination that the second base station is serving the second UE located in close proximity to the first UE comprises:
making the determination before transmitting any bearer data to the first UE over the two or more beams.

4. The method of claim 1, wherein making the determination that the second base station is serving the second UE located in close proximity to the first UE comprises:
making the determination after transmitting bearer data to the first UE over the two or more beams for some period of time.

5. A base station arranged to manage communication on multiple beams, the base station comprising:
a wireless communication interface arranged to engage in air-interface communication with one or more user equipment devices (UEs); and
a controller,
wherein the controller is configured to decide that the base station is to serve a first UE over two or more beams, wherein each of the two or more beams defines a distinct respective radiation pattern from the base station to the UE, and wherein deciding that the base station is to serve the first UE over the two or more beams comprises determining a modulation and coding scheme (MCS) based on one or more channel quality indicators (CQIs) received from the first UE and deciding initially that the base station is to use the determined MCS on each of the two or more beams,
wherein the controller is configured to make a determination that an adjacent second base station is serving a second UE located in close proximity to the first UE, wherein making the determination that the adjacent second base station is serving the second UE in close proximity to the first UE comprises obtaining, from the second base station or from a network controller, location data for the second UE, and comparing location of the second UE with location of the first UE and determining that a distance between the second UE and first UE is threshold short,
wherein the controller is configured to, in response to the determination that the adjacent second base station is serving a second UE located in close proximity to the first UE, (i) change the MCS for a first of the beams from the determined MCS to a different MCS that is higher or lower order than the determined MCS, and (ii) cause the base station to serve the UE concurrently over the two or more beams using the different MCS for transmission from the base station to the UE over the first beam while using the determined MCS for transmission from the base station to the UE over a second of the beams.

6. The base station of claim 5, wherein the wireless communication interface comprises an antenna structure and a wireless transceiver.

7. The base station of claim 5, wherein the controller comprises:
a processing unit;
a non-transitory computer readable medium; and
executable instructions stored on the non-transitory computer readable medium.

8. A non-transitory computer readable medium having instructions stored thereon, wherein the instructions are executable by a processing unit to cause a base station to carry out the functions of:
deciding to serve a first user equipment device (UE) over two or more beams, wherein each of the two or more beams defines a distinct respective radiation pattern from the base station to the UE, and wherein deciding to serve the first UE over the two or more beams comprises (i) determining a modulation and coding scheme (MCS) based on one or more channel quality indicators (CQIs) received from the first UE and (ii) deciding initially to use the determined MCS on each of the two or more beams;
making a determination that an adjacent second base station is serving a second UE located in close proximity to the first UE, wherein making the determination that the adjacent second base station is serving the second UE in close proximity to the first UE comprises (i) obtaining, from the second base station or from a network controller, location data for the second UE, (ii) comparing location of the second UE with location of the first UE and determining that a distance between the second UE and first UE is threshold short; and
in response to the determination that the adjacent second base station is serving a second UE located in close proximity to the first UE, (i) changing the MCS for a first of the beams from the determined MCS to a different MCS that is higher or lower order than the determined MCS, and (ii) serving the UE concurrently over the two or more beams using the different MCS for transmission from the base station to the UE over the first beam while using the determined MCS for transmission from the base station to the UE over a second of the beams.

* * * * *